United States Patent

[11] 3,612,462

| [72] | Inventors | Paul C. Mooney<br>Northbrook;<br>Howard Emmett Shelley, Niles, both of Ill. |
| --- | --- | --- |
| [21] | Appl. No. | 853,099 |
| [22] | Filed | Aug. 26, 1969 |
| [45] | Patented | Oct. 12, 1971 |
| [73] | Assignee | Quick-Set Incorporated |

[54] INSTRUMENT MOUNT ASSEMBLY
16 Claims, 5 Drawing Figs.

[52] U.S. Cl. .................................................. 248/346,
248/187
[51] Int. Cl. ..................................................A47g 29/00,
F16m 1/100
[50] Field of Search........................................... 248/346,
187, 25, 154, 361

[56] References Cited
UNITED STATES PATENTS
2,351,386  6/1944  Zucker ........................ 248/187 X

| 2,482,708 | 9/1949 | Gordinier..................... | 248/361 X |
| 2,834,567 | 5/1958 | Young.......................... | 248/187 |
| 2,905,427 | 9/1959 | Roeder......................... | 248/346 |
| 3,429,543 | 2/1969 | Mooney ....................... | 248/346 |

*Primary Examiner*—Chancellor E. Harris
*Attorney*—Hofgren, Wegner, Allen, Stellman & McCord ABSTRACT: An improved instrument mount assembly including a plate and base for securing a sighting or photographic equipment to a support, the assembly being characterized by a pivoted clamp bar in the base, which, when engaged by an instrument bearing the plate element thereon, automatically retracts to an instrument retaining position. A locking latch is associated with the clamp bar to lock the same to tightly clamp the plate and hold the instrument against any movement relative to the mount following emplacement of the sighting or camera instrument thereon.

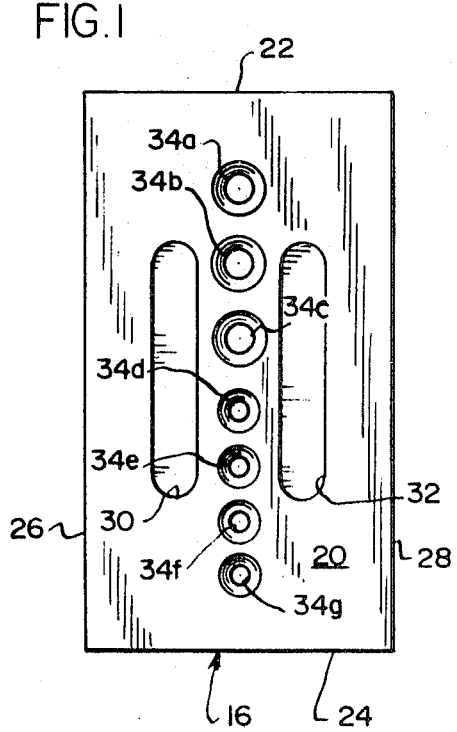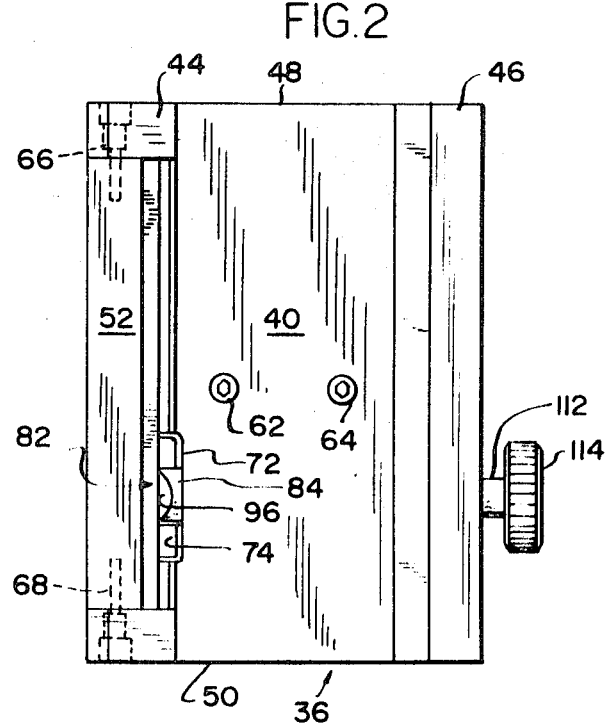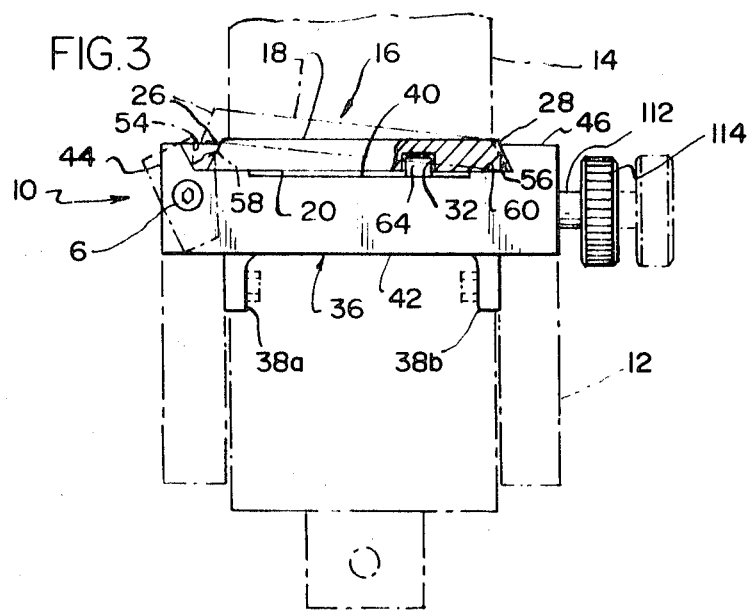
INVENTORS
PAUL C. MOONEY
HOWARD EMMETT SHELLEY
BY Hofgren, Wegner, Allen, Stellman & McCord,
ATTORNEYS.

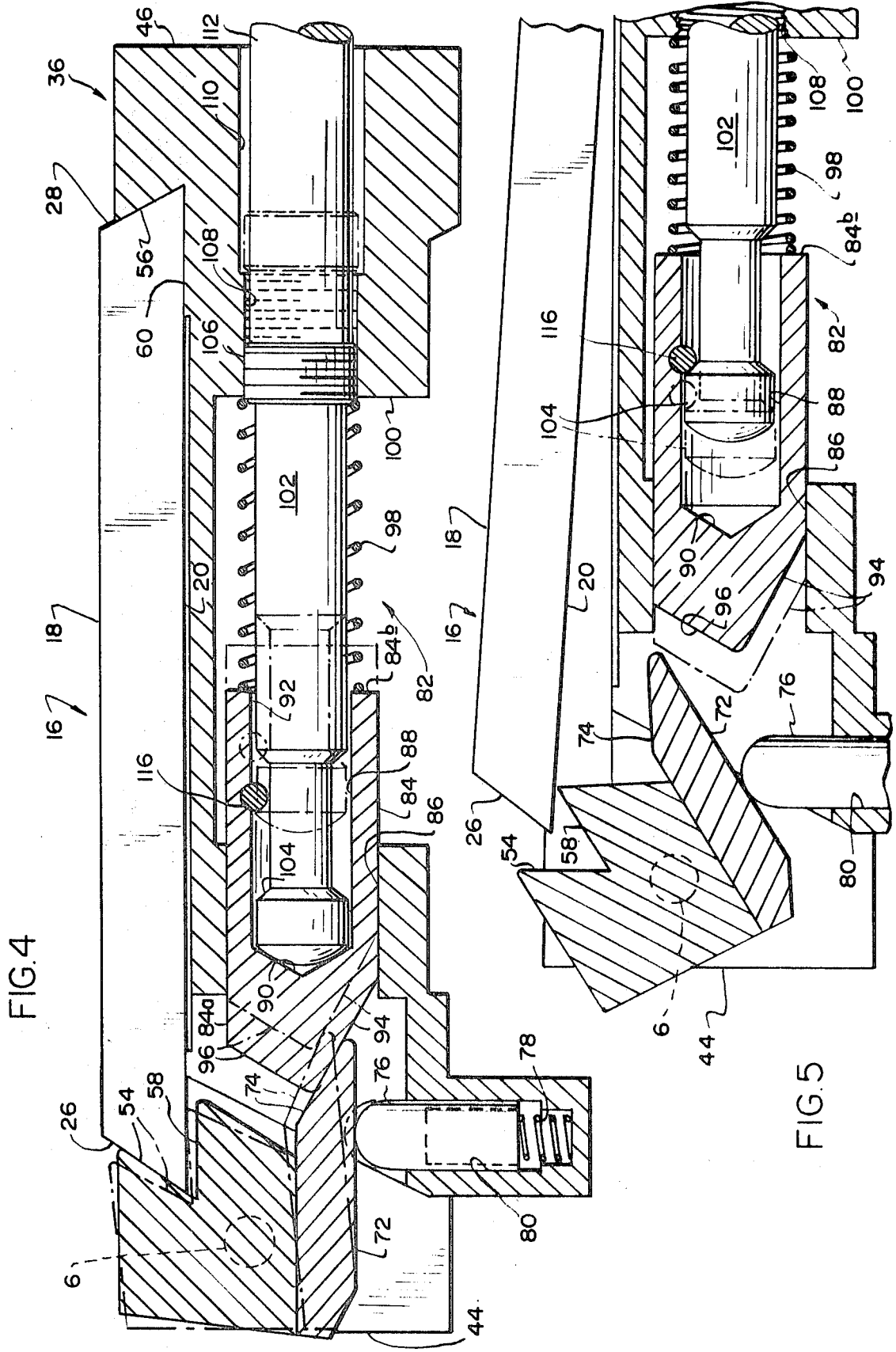

3,612,462

INSTRUMENT MOUNT ASSEMBLY

BACKGROUND OF THE INVENTION

1. Field of the Invention

This invention relates to a mounting assembly for detachably connecting a sighting or photographic equipment or the like to a supporting base.

2. Brief Description of the Prior Art

This invention is an improvement in the structure shown in my U.S. Pat. No. 3,429,543, entitled "Instrument Mount" issued Feb. 25, 1969, as well as an improvement in the art cited therein.

The invention of my aforesaid patent is directed to a mounting assembly for sighting equipment comprising a two-part structure, one of which was intended for securement to the underside of a sighting instrument, such as a camera, and the other of which was intended for securement to the top of a supporting surface. The two parts were provided with mutually engageable sidewall surfaces including opposed upstanding walls and opposed mating dovetail surfaces to prevent relative movement of one part relative to the other one in the assembled condition. The base was provided with a movable locking member urged by an eccentrically positioned, spring urged lever which abutted the locking member so that movement of the lever caused to and fro movement of the locking member to lock and release the two parts. Generally speaking, the instrument mount of the aforesaid patent required utilization of one hand to move the locking member while the other hand was engaged in placing the sighting instrument or camera on the base.

Whereas the aforesaid invention was very suitable for smaller and average sized sighting instruments, the manipulation involved was difficult to execute with respect to heavy sighting equipment, particularly when such emplacement was attempted by persons of small stature and/or by persons attempting to emplace the sighting equipment on a supporting surface which was of relatively significant height. Thus, a need and desire has arisen to provide an improved mounting assembly particularly suited for use with heavy sighting or camera instruments such as to enable the initial facile emplacement thereon by merely depositing the equipment on a base and this invention is directed toward meeting the aforesaid need and desire.

SUMMARY OF THE INVENTION

This invention is directed, in brief, to the provision of an improved instrument mounting assembly for sighting or photographic equipment.

The best mode currently contemplated by me for carrying out the invention includes a two-part structure. One part is intended for securement to the bottom of the sighting instrument and the other part is a supporting base which is intended for securement to a suitable supporting surface. The two parts have mutually engageable sidewalls, preferably including mating dovetail surfaces.

One sidewall of the base performs the function of a clamp bar and is pivoted between an open position, wherein the platelike element attached to the underside of the sighting instrument may be inserted and withdrawn relative to the base; and a closed position, wherein the platelike element is captivated in assembled condition with the base. A latch assembly is associated with the pivoted wall of the base for tightly clamping the pivoted wall against the plate member to prevent any relative movement between the two following the initial assembly thereof.

BRIEF DESCRIPTION OF THE DRAWINGS

FIG. 1 is a bottom plan view of the plate element utilized with the instrument mount assembly of this invention;

FIG. 2 is a top plan view of the base unit of the instrument mount assembly of this invention;

FIG. 3 is an end elevational view of the instrument mount assembly of this invention;

FIG. 4 is an enlarged vertical section view of the instrument mount assembly of this invention showing the clamping element of the base in a closed position; and FIG. 5 is a fragmentary enlarged section view similar to FIG. 4 showing the clamping bar in the open position.

While this invention is susceptible of embodiment in many different forms, there is shown in the drawings and will herein be described in detail a specific embodiment therefor, with the understanding that the present disclosure is to be considered as an exemplification of the principles of the invention and is not intended to limit the invention to the embodiment illustrated.

BRIEF DESCRIPTION OF THE PREFERRED EMBODIMENT

Referring now to the drawings, the instrument mounting assembly 10 of this invention is intended for use with a supporting surface or supporting element 12 which may be a fixed surface or a cam head type supporting structure as disclosed and claimed in my copending application entitled "Cam Head Structure for Camera Support" Ser. No. 739,795, filed June 25, 1968, now U.S. Pat. No. 3,545,710, issued Dec. 8, 1970. The mounting assembly 10 is intended for use in mounting a suitable instrument 14 which may be a camera, a sighting instrument or other type of photographic or photocamera instrument such as a television camera or the like.

Generally speaking, the mounting assembly 10 is comprised of two parts, including a generally rectangular plate 16 which is intended for securement to the underside of the instrument 14. Plate 16 includes a top 18 and a bottom 20, opposed ends 22 and 24 and opposed sidewalls 26 and 28, preferably of a dovetail configuration. The bottom 20 is provided with channels 30 and 32 therein and countersunk openings 34a, 34b, 34c, 34d, 34e, 34f and 34g generally along the longitudinal centerline of the bottom to provide a means for mounting the plate to the underside of sighting instruments of different physical characteristics.

Mounting assembly 10 further includes a base 36, the base 36 generally being a rectangular blocklike member which may include suitable means, such as the depending webs 38a and 38b for securement to an intermediate supporting structure such as the aforementioned cam head type support. Base 36 includes a channeled top 40 and a bottom 42. Opposed sidewalls 44 and 46 extend upwardly above the channeled top 40 with the ends 48 and 50 of the base preferably being opened in the channeled area.

Sidewall 44 is interrupted intermediate its ends to provide a movable sidewall portion or clamping bar 52. Clamping bar 52, as well as sidewall 46, are provided with mating inwardly directed dovetail surfaces 54 and 56, respectively, which terminate in inwardly directed shoulders or plate bottom supporting surfaces 58 and 60, respectively. One or two upstanding posts or the like 62 and 64 may project above the channeled top 40 and are intended to be received within the slots 30 and 32, respectively, on the underside of plate 16. This will permit limited to and fro movement of the plate relative to the base 36 when the plate is assembled thereon.

Pins 66 and 68 extending in from opposite ends of wall portion 44 pivotally mount clamp bar 52 on one side of base 36 for movement between an open position, as shown in FIGS. 3 and 5, wherein the baseplate 16 and any instrument connected thereto may be withdrawn from, or emplaced on, the base; and a closed position, as shown in FIG. 4, wherein the baseplate 16 and any instrument attached thereto is held against vertical dislodgment from the base. As previously mentioned, the slots 30, 32 and pins 62, 64 prevent lateral dislodgment of plate 16 between ends 48 and 50, and the mating association of surfaces 26 and 28 with respect to surfaces 54 and 56 prevent lateral dislodgment of the plate relative to the base in a transverse direction.

Clamp bar 52 includes an inwardly projecting leg 72 intermediate the ends thereof which extends inwardly of the base below shoulder 58. Leg 72 includes a generally downwardly and inwardly inclined upper latch member engaging surface 74. A plunger 76 upwardly biased by spring 78 and residing in aperture 80 in the base abuts the underside of the leg 72 of the clamp bar 52 to normally urge clamp bar 52 to the open position shown in FIGS. 3 and 5.

The base 36 further includes a means 82 for locking or latching the clamp bar in the closed position and for further moving the clamp bar to a position for tightly clamping the plate 16 against movement relative to the base. Included in this means is a generally cylindrical plunger 84 slidably mounted for movement in a bore 86 in the base along an axis generally perpendicular to the axis of rotation of the clamp bar 52. Plunger 84 has a hollow interior 88 which terminates in a closed end 90 at one end, and an open end 92 at the other end. The forward end 84a of the plunger includes a lower clamp member engaging or locking surface 94 and an upper inclined cam surface 96. As viewed in side elevation as seen in FIGS. 4 and 5, the forward end of the plunger 84 has a generally V-shaped configuration. It is to be understood that this specific configuration is one preferred form of the invention but that the specific configuration of the forward portion of the plunger may take different forms within the scope of this invention. The general concept of the invention is that there should be provided on the plunger 84, a clamp member engaging surface and a cam surface for cooperating with the clamp member during movement thereof to the retracted position as will be explained later.

A biasing means 98 in the form of a coil spring extends between the rear 84b of the plunger 84 and a spaced depending portion 100 of the base for normally urging the plunger 84 towards the clamp bar 52.

The latching means 82 further includes a pin 102 which is received within the bore 88 of plunger 84. Pin 102 includes an enlarged end 104 which abuts the forward interior 90 of plunger 84. Pin 102 further includes an enlarged threaded portion 106 intermediate its ends which is intended for threaded engagement of the threaded interior 108 of the bore 110 in base 36. Bore 110 is preferably coaxial relative to bore 88. Pin 102 further includes a reduced shank portion 112 beyond the threaded portion 106 to which the knob 114 is connected. A cross pin 116 is positioned in the interior 88 of the plunger 84 so that, in cooperation with the enlarged head 104 of pin 102, abutment means are provided for preventing the withdrawal of pin 102 relative to the interior of plunger 84, while permitting relative slidable movement between the two.

In operation, the baseplate 16 is secured to the underside of a suitable sighting instrument 14 by inserting a fastening means through one of the openings 34a through 34g appropriate for the size of the sighting instrument 14 with which the assembly is intended to be used. Following this, the base is conditioned as shown in FIGS. 5 and 3 so that the clamp bar 52 is in an open position. An operator may then grasp the sighting instrument in one or two hands and place the same downwardly on the clamp bar as shown in FIGS. 3 and 5. The underside of plate 20 will come to rest on shoulder 58 causing the clamp bar 52 to be pivoted about its pivotal mounting 66, 68 and bring it to the closed position as shown in dotted outline in FIG. 4. In the meantime, the leg 72 of the clamp bar will have engaged the surface 96 of plunger 84, causing the plunger to momentarily retract, as shown in dotted outline in FIG. 4, against the urging of spring 98 until the leg 72 has moved therepast, at which time the plunger will move forwardly so that the surface 94 of the plunger overrides and is in engagement with the surface 74 of the leg, opposing upward movement of clamp bar 52. Thus, the plate 16 and its attached sighting instrument is sufficiently captivated against reverse withdrawal in a vertical direction away from the base 36 due to the cooperative retention of surfaces 26 and 54 and 28 and 56 and the initial locking action of plunger 84. In addition, posts 62 and 64, riding in slots 30 and 32 prevent lateral dislodgment as well. Following this, the pin 102 is threaded by way of engagement between threaded surfaces 106–108 so as to advance the enlarged end 104 within the hollow interior of the plunger 88 until end 104 engages forward end 90 of the hollow interior 88. Continued threadable advancement of the pin 102 causes the plunger 84 to advance which, in turn, increases the advancement of surface 94 of the plunger on surface 74 of the clamp bar 52. This continued advancement causes the clamp bar 52 to be further rotated downwardly about its axis and causes surface 54 of the clamp bar to intimately engage and clamp upon surface 26 of plate 16 with the force being asserted in a downward and inward direction in opposition to the engagement of surfaces 28 on the opposite side of plate 16 and 56 on the opposite side of base 36. With the understanding that in the interim, the plate 16 may be moved to and fro as afforded by the slots 30–32 and pins 62 and 64 until the proper front to rear orientation is attained, this threaded advancement of pin 102 and plunger 84 will serve to tighten the locking of plate 16 and any sighting instrument affixed thereto against any movement relative to base 36.

When it is desired to remove the sighting instrument 14 from base 36, pin 102 is reversely threaded until threads 106 clear threaded bore 108. Pin 102 may then be retracted by grasping knob 114 and pulling in opposition to base 36 so that enlarged end 104 will engage cross pin 116 and further pull plunger 84 rearwardly. This will permit plunger 76 to automatically pivot clamp bar 52 upwardly and outwardly to the open position as shown in FIG. 5 when the plate 16 and attached sighting instrument 14 are withdrawn.

The instrument mount assembly of this invention is thus most particularly suited for use in mounting heavy or bulky cameras or sighting equipment which would normally require the employment of both hands of a user. By merely emplacing the camera or the like with the plate 16 attached to the underside thereof onto the base 36, the clamp bar is tripped from its open position to an initial locking position and the camera and its associated plate are held against dislodgment against the base. Following this, the plate member may be subsequently secured to lock the sighting instrument in its intended position on the base.

The foregoing detailed description has been given for clearness of understanding only, and no unnecessary limitations should be understood therefrom, as some modifications may be obvious to those skilled in the art.

We claim:

1. A mounting assembly for releasably mounting an instrument to a supporting surface including: a plate have opposed depending sidewalls, a top face, a bottom face and means in the plate for securement of the top face of the plate adjacent the underside of a sighting instrument with the opposed sidewalls of the plate projecting therefrom; a securement base including a member having opposed wall surfaces positioned a distance apart generally corresponding to the distance between the opposed sidewalls of the plate to be received therebetween, one of said sidewall surfaces being a movable clamp member; said clamp member being movable between an open position wherein the plate may be received therein or withdrawn therefrom, and a closed position wherein the plate is loosely embraced between the clamp member and an opposite wall surface, latch means in said base operably associated with said clamp member when said clamp member is in the retracted position including an engaging surface for engaging the clamp member, the latch means including a member movable from a release position, wherein the clamp member may be moved to an open position, to an initial locking position for engaging the clamp member when the clamp member is closed, to a firm locking position, said movement to said firm locking position causing said clamp member engaging surface to further move said clamp member to position the same in a position tightly embracing a plate held between said clamp member and an opposed wall surface.

2. The assembly of claim 1 including means in the base for normally urging the clamp member to an open position.

3. The assembly of claim 1 wherein the clamp member is pivoted between said open and closed positions and pivots downwardly towards said closed position.

4. The assembly of claim 3 wherein said latch member moves said clamp member further downwardly to tightly embrace a plate member therebetween.

5. The assembly of claim 1 wherein said latch member is a pinlike element received in aligned openings in the base.

6. The assembly of claim 5 wherein the latch member extends generally transversely to the longitudinal extent of the clamp member.

7. The assembly of claim 6 wherein portions of the latch member and base member have cooperating engageable surfaces for holding the latch member in the locking position and for causing said clamp member to tightly engage a plate between the clamp member and an opposing wall portion.

8. A mounting assembly for releasably mounting an instrument to a supporting surface including: a plate having opposed depending sidewalls, a top face, a bottom face and means in the plate for securement of the top face of the plate adjacent the underside of a sighting instrument with the opposed sidewalls of the plate projecting therefrom; a securement base including a member having opposed wall surfaces positioned a distance apart generally corresponding to the distance between the opposed sidewalls of the plate to be received therebetween, one of said opposed wall surfaces being a movable clamp member; said clamp member being a barlike member having an interior surface including a first dovetail or plate sidewall mating surface which terminates in a second inwardly extending shoulder for receiving the plate bottom, and an inwardly extending shoulder below the first inwardly extending shoulder for receiving the latch member engaging surface; said clamp member being movable between an open position wherein the plate may be received therein or withdrawn therefrom, and a closed position wherein the plate is loosely embraced between the clamp member and an opposite wall surface, latch means in said base operably associated with said clamp member when said clamp member is in the retracted position including an engaging surface for engaging the clamp member, the latch means including a member movable between a release position, wherein the clamp member may be moved to an open position, and a locking position for engaging the clamp member when the clamp member is closed, said movement to said locking position causing said clamp member engaging surface to further move said clamp member to position the same in a position tightly embracing a plate held between said clamp member and an opposed wall surface.

9. The assembly of claim 8 wherein the engaging surface of the latch member comprises the lower surface of the forward end of a biased plunger which further is provided with an upper cam surface, with spring means normally urging the plunger towards the clamping member whereby, when the clamp member retracts to engage the cam surface of the latch member, the latch member is momentarily retracted in opposition to the biasing force so that the clamp member can ride therepast, following which the biasing force of the spring means advances the plunger so that the engaging surface thereof abuts the second shoulder on the clamp member to thereby prevent reverse pivotal movement thereof.

10. The assembly of claim 9 wherein the plunger has a hollow interior opening to the rear thereof with the forward end of the pinlike element being received within the hollow interior of the plunger and being axially movable relative thereto with means in the interior of the plunger and the exterior of the pinlike member to prevent withdrawal of the pinlike member from the interior of the plunger.

11. The assembly of claim 10 wherein the pin element has a screw thread on a portion of the exterior intermediate the ends thereof and the base has an aperture with a threaded interior for receiving the screw threaded exterior portion of the pinlike member for moving the plunger toward and away from the clamp member, whereby reverse threading of the pin element relative to the base aperture causes disengagement of the pin element relative thereto so that further withdrawal of the pin element in opposition to the biasing means permits retraction of the plunger from the clamp member.

12. The assembly of claim 11 including a second biased plunger which normally urges said clamp bar to the open position.

13. A mounting base for releasably mounting a sighting instrument having a plate with depending sidewalls secured to the underside of the sighting instrument, the mounting base including a clamping bar pivoted about a first axis for movement between an open and a closed position; a latch member in the base movable toward and away from the clamp bar along an axis generally transverse thereto; the clamp bar having a plate receiving and engaging surface including generally inwardly directed surfaces and further being provided with an inward extending leg including a latch member engaging surface below said plate receiving and engaging surfaces, the latch member having an upper cam surface and a lower clamp bar engaging surface, the upper cam surface being normally positioned in the path of movement of the leg of the clamp bar, the latch member being retractable responsive to movement of the clamp member between the open and closed position whereby the clamp member engages the latch member cam surface, with means for returning the latch member toward the clamp bar following movement of the clamp bar therepast.

14. The mounting base of claim 13 including means for moving the latch member towards the clamping bar.

15. The mounting base of claim 14 including a second plunger member normally urging said clamping bar to the open position.

16. The mounting base of claim 13 wherein said latch member and base include cooperative locking surfaces for holding the latch member in an extended position wherein the latch member and clamp bar engaging surfaces are in mutual engagement with each other.